Patented Feb. 8, 1949

2,461,004

UNITED STATES PATENT OFFICE 2,461,004

TREATMENT OF HYDROCARBON RESINS AND PRODUCTS THEREOF

Frank J. Soday, Baton Rouge, La., assignor to The United Gas Improvement Company, a corporation of Pennsylvania No Drawing. Application June 20, 1944, Serial No. 541,266

7 Claims. (Cl. 260—80)

This invention pertains to the decolorization of hydrocarbon resins.

More particularly, this invention relates to the decolorization of certain resins derived by the polymerization, either by thermal and/or catalytic methods, of the high boiling monomeric hydrocarbon material separated in monomeric form from tar formed during the production of combustible gas by processes involving the pyrolytic decomposition of petroleum oil with or without the aid af catalysts.

I have discovered that the color of such resins may be greatly improved by a process comprising depolymerization, preferably in the form of a thin layer or film, of the said resin or a solution of the said resin, followed by the repolymerization of the monomeric material obtained.

The unexpected results obtained as a result of the foregoing process appears to be traceable to the fact that the darker-colored constituents of the said resin either depolymerize at a slower rate than the lighter-colored constituents, and/or the depolymerization products resulting from the darker-colored constituents are isomerized to form monomeric materials capable of polymerization to light-colored resinous products.

As pointed out previously, the resins employed in the practice of my invention are obtained by the thermal and/or catalytic polymerization of the unsaturated monomeric material boiling within the range of from 210° to 450° C., and particularly between 210° C. and 350° C. and separated in monomeric form from the higher boiling pitch constituents of tar formed during the production of gas by processes involving the pyrolytic decomposition of petroleum oil, either with or without the aid of catalysts.

The hydrocarbon constituents of such petroleum tar have usually been considered to comprise residual tar, dead oil, and light oil. The residual tar comprises the heavy black pitch constituents of the tar together with any oil unseparated therefrom. The dead oil comprises oil separated from the residual tar and boiling higher than say 200–210° C. The light oil comprises oil separated from residual tar and boiling lower than say 200–210° C.

It has been discovered that very considerable quantities of such resin forming unsaturated monomeric material above referred to, including large quantities of readily heat polymerizable material, may be contained in the tar produced in the vapor phase pyrolysis of crude petroleum oil or a fraction or fractions thereof, such as, for example, gas oil or residuum oil. This is particularly so in the case of petroleum oil gas tar produced when the pyrolysis is conducted at relatively high temperatures, such for example as in the manufacture of oil gas or carburetted water gas at average set temperatures above 1300° F. and, also, particularly so when the oil pyrolyzed is naphthenic, such as a crude oil classifiable in classes 5 to 7 inclusive, according to the method of classification described in Bureau of Mines Bulletin 291, as modified by Bureau of Mines Report of Investigations 3279, or a fraction or fractions of such an oil.

The possibility of recovering large quantities of resin forming monomeric unsaturated material boiling in the dead oil range was long unrealized. This was because the usual distillation procedures for the purpose of petroleum tar dehydration and/or tar fractionation were such as to polymerize the readily heat polymerizable monomers boiling in the dead oil range into heavy polymers, which were inextricably mixed with the heavy black residual pitch constituents and lost therein.

In copending application Serial Number 370,608, filed December 18, 1940, by Edwin L. Hall and Howard R. Batchelder, which has matured into Patent No. 2,387,259, granted October 23, 1945, such heat polymerizable monomeric hydrocarbons boiling in the range of from 210 to 450° C. and separated from the heavy black pitch constituents of the petroleum tar are described and claimed, together with heat polymers produced therefrom.

In copending application 386,232, filed April 1, 1941, by Waldo C. Ault, which has matured into Patent No. 2,387,237, granted October 23, 1945, there is described and claimed the production of catalytic resins from the heat polymerizable and/or catalytically polymerizable monomeric hydrocarbons boiling within the range of from 210° C. to 450° C. and separated in monomeric form from the heavy black pitch constituents of the petroleum tar.

In the manufacture of oil gas and carburetted water gas, the tar produced is usually in the form of an emulsion due to the condensation of hydrocarbon constituents from the gas in the presence of water simultaneously condensed from the gas, or otherwise present.

In copending application 342,735, filed June 27, 1940, by Edwin L. Hall and Howard R. Batchelder, which has matured into Patent No. 2,366,899, granted January 9, 1945, there is described a method of dehydrating such petroleum tar emulsions and of fractionating the hydrocarbon constituents thereof by rapid distillation, with the separation from the heavy pitch constituents of residual tar of such heat polymerizable unsaturated monomeric hydrocarbons boiling in the dead oil range.

In copending application 353,034, filed August 17, 1940, by Howard R. Batchelder, which has matured into Patent No. 2,383,362, granted August 21, 1945, there is described the dehydration of such petroleum tar emulsions and the fractionation of the hydrocarbon constituents thereof, with the recovery of monomeric unsaturated heat polymerizable dead oil constituents separate from the heavy black pitch constituents of residual tar, by the solvent extraction of the emulsion with a hydrocarbon solvent such as liquefied propane or butane.

Other processes, for example fractional condensation, might be employed to recover these relatively high boiling unsaturated hydrocarbons in monomeric form and separate from the heavy black pitch constituents of the tar. Also processes for oil pyrolysis which avoid the formation of emulsions, may be employed for the production of the monomeric material. Furthermore, while it may be preferred to employ for pyrolysis petroleum oils or cuts therefrom, which are classifiable in classes 5 to 7 inclusive according to Bureau of Mines Bulletin 291, modified as indicated above, and particularly in class 7, other oils may be employed.

Whatever process of oil pyrolysis is employed in the production of this monomeric material and whatever process is employed for separating the resultant tar, a very important factor is the exercise of care in the treatment of the tar in order to avoid excessive polymerization of these readily heat polymerizable dead oil constituents and their loss as polymers, mixed with the heavy black pitch constituents of the residual tar.

As a result of separation of the light oil and dead oil components of the products of such petroleum oil pyrolysis from the residual tar, without polymerization or with materially reduced polymerization, a substantially pitch-free hydrocarbon material may be separated having a portion boiling within the range of from 210 to 450° C., and particularly within the range from 210° C. to 350° C., which may contain from 5% to 30%, and higher, of monomeric unsaturated hydrocarbons readily polymerizable by heat.

The particular concentration of this heat polymerizable monomeric material obtained in a given case will depend upon the amount of polymerization produced in separating it from the residual tar, as well as upon such factors as the condition of pyrolysis and the character of the petroleum oil pyrolyzed.

As previously stated, the above mentioned heat polymerizable monomeric material may be readily polymerized by heat to form valuable resins.

Polymerization may be effected by heating the total material separated from the residual tar sufficiently to polymerize the readily heat polymerizable monomers boiling within the range of from 210° to 450° C., but insufficiently to appreciably polymerize the heat polymerizable material contained in lower boiling ranges, such, for instance, as styrene and the methyl styrenes. This may be accomplished, for example, by heating with stirring for 4 hours at 200° C., followed by distillation under vacuum to isolate the resin.

It may be preferable, however, to first effect a separation by fractional distillation between light oil boiling below, say, 210° C., and dead oil boiling above, say, 210° C.

The heat polymerizable monomeric material boiling within the range of 210° to 450° C. is so readily polymerizable by heat, that, in the fractional distillation of the light oil from the dead oil, a portion of the monomeric material is usually unavoidably polymerized and remains as polymer dissolved in the other constituents of the dead oil after the light oil is taken off overhead.

The polymerization of the heat polymerizable unsaturated monomeric material in the separated dead oil may be effected by heating the dead oil with stirring, for example, for four hours at 200° C.

The resin thus produced, together with any resin produced during the separation of the light oil from the dead oil, may then be isolated by distillation under vacuum.

In the separation of lower boiling hydrocarbon material from the pitch constituents of residual tar by various methods, the oil separated may contain components boiling above 350° C. and there may be present heat polymerizable monomeric material boiling outside the range of from 210° C. and 450° C., together with the monomeric material boiling within that range. On polymerization, therefore, the resin may include polymers derived from monomers boiling outside of the said range along with polymers derived from monomers boiling within the said range.

As hereinbefore stated, after polymerization the resin may be isolated by distillation in vacuum, which may be assisted by steam. The yield, melting point, and other characteristics of the resin will depend upon the extent to which the isolation has been carried, or, in other words, upon the proportion of associated oils left in the resin.

Exhaustive steam distillation of the resins obtained from the unsaturated monomeric material isolated from tar by the distillation or solvent extraction methods described herein have produced resins having melting points as high as from 185° C. to 200° C. and higher, cube in mercury, as determined by the method and apparatus described in A. S. T. M. Procedure D61–24, with the following modifications.

1. Mercury is employed in depth of 2½ inches instead of water.
2. The cube of resin is rigidly supported by clamping the hook upon which the resin is attached so that the top of the cube is 1 inch below the surface of the mercury.
3. A 1½ inch immersion thermometer is employed and is immersed to that depth.
4. The exact temperature at which the resin becomes visible at the surface of the mercury is recorded as the softening point of the resin.
5. The melting point of the resin is calculated from the softening point by the following formula.

Melting point °C. = Softening point °C. × 1.25 + 2° C.

The melting point of the resins described in this specification is intended to mean melting point as determined by the above recited method, unless otherwise specified.

Lower melting point resins may be readily obtained in greater yields by less exhaustive removal of the associated oils, thus resins ranging from very soft to hard resins having high melting points may be obtained as desired.

It has been usually found that each 6% of associated oils left in the resin lowers the melting point about 10° C.

Heat resins having melting points of 120° C.

have been readily produced in yields corresponding to 20 to 30% of the dead oil in the case of the tar distillate produced in accordance with the process described in copending application, Serial No. 342,735, and resins of the same melting point have been obtained in yields as high as 60% of the dead oil in the case of dead oil separated from extract produced in the process described in application Serial No. 353,034.

The heat polymerizable unsaturated monomeric material is preferably in sufficient concentration in that portion of the hydrocarbon material separated from the residual tar which boils within the range of from 210° to 450° C. to produce on polymerization by heat a 120° C. melting-point resin in quantity equal to at least 10 percent of the hydrocarbon material boiling within the range from 210° C. to 450° C., and preferably at least 20 percent, or higher, but lower concentrations may be employed.

The color of the resins obtained usually are quite dark.

The following examples will serve to illustrate the preparation of resins from such unsaturated fractions by thermal polymerization methods.

Example 1

Approximately 1000 grams of dead oil derived from the rapid distillation of oil gas tar in accordance with the process described in said copending application, Serial No. 342,735, and subsequent separation of the distillate, was weighed into a 2-liter 3-necked flask equipped with a thermometer and a short reflux condenser. The oil was then slowly stirred and heated over a Bunsen burner at a liquid temperature of 200° C. (±10° C.) for a period of 4 hours.

At the conclusion of this period, the material was allowed to cool somewhat and was then transferred for distillation to a tarred 2-liter flask equipped with a ground glass neck.

The oil was accurately weighed at this point.

The flask was provided with means for measuring vapor temperatures, and was connected with condensing apparatus and with means for providing a vacuum, including a pressure control device. Bumping during distillation was avoided by folding several folds of iron wire to such length that one end reached slightly into the neck of the flask while the other end rested on the bottom of the flask.

The pressure was reduced to 100 mm. Hg, absolute, and heat applied by means of a Bunsen burner. The distillation was continued at a pressure of 100 mm. Hg, absolute, until the vapor temperature reached 180° C. During this first stage of the distillation, care should be exercised to prevent crystallization of naphthalene, if present, such as by employing a condenser operating at elevated temperatures.

When the vapor temperature reached 180° C. at a pressure of 100 mm. Hg, absolute, the flange was lowered and the pressure gradually reduced to 20 mm. Hg, absolute, using care to avoid bumping. When a pressure equivalent to 20 mm. Hg, absolute, was reached, the pressure was maintained at that value, and the distillation continued until a vapor temperature of 195° C. was reached.

During the second stage, the condenser may be cooled by cold water, but care should be taken to avoid the solidification of anthracene, if present.

The distillation was conducted rapidly, 5 to 10 cc. of oil per minute being removed.

When a vapor temperature of 195° C. was reached, the source of heat was removed and air was permitted to enter the apparatus slowly until atmospheric balance was restored.

In the above operation the yield of resin was 29.3%, with an actual melting point of 128° C., which was calculated to be equivalent to a yield of 31.4% at a melting point of 120° C. The resin was brown in color.

A straight run A. S. T. M. distillation of 100 cc. of the original oil gave the following data:

| | |
|---|---|
| First drop | °C__ 194 |
| 5 cc. | °C__ 212 |
| 10 cc. | °C__ 223 |
| 20 cc. | °C__ 234.5 |
| 30 cc. | °C__ 242.5 |
| 50 cc. | °C__ 256.5 |
| 70 cc. | °C__ 283.0 |
| 90 cc. | °C__ 319.0 |
| Decomposition point | °C__ 319.0 |
| Total distillate | cc__ 87 |
| Density at 20° C. | 1.0107 |

As pointed out previously, the high boiling monomeric material derived from tar obtained in the pyrolysis of petroleum, by rapid distillation or solvent extraction methods, may be polymerized to form resins of the type desired by the application of certain catalysts, either with or without the simultaneous, or otherwise, application of heat.

Catalysts such as mineral acids, for example, sulfuric acid, hydrogen chloride, acids of phosphorus, or acid acting metallic halides or complexes of said halides, preferably organic solvent complexes, as for example, boron trifluoride, aluminum chloride, boron trifluoride-diethyl ether complex, boron trifluoride-demethyl ether complex, boron trifluoride-phenyl ether complex, boron trifluoride-phenyl methyl ether complex, boron trifluoride-dioxan complex, boron trifluoride-toluene complex, corresponding aluminum chloride complexes, and the like, may be employed for this purpose.

The metallic halides and their complexes employed are characterized by their ability to hydrolyze in the presence of water to give an acid reaction and, hence, for convenience they may be termed acid-acting metallic halides.

Though acid-acting catalysts are preferred, other catalysts may be employed if desired such, for example, as catalysts of the neutral surface type. Examples of such catalysts are activated clays, silica gel, activated carbon, and the like.

As an example of a convenient procedure for the production of resins of the type desired with the use of sulfuric acid as catalyst, the following is given.

Example 2

A sample of the oil to be polymerized, say 500 cc., is poured into a two-liter 3-neck flask equipped with a thermometer and stirrer. To the oil is added 96% $H_2SO_4$ while agitating vigorously. The acid is added 1 cc. at a time and the temperature is not permitted to exceed 50° C. The addition of the acid is continued in this manner until no further temperature rise is noted. The amount of acid necessary to achieve this end has been found to be about 1%, by volume, of the oil present.

The oil then is diluted with approximately an equal volume of naphtha, toluene, or similar diluent, and the solution decanted into 500 cc. of war water (approximately 60° C.), leaving the acid sludge behind.

After settling, the water layer is drawn off, and neutralization of the acid is accomplished by use of a 10% to 20% aqueous solution of sodium hydroxide. After washing with caustic, an additional water wash may be made. In either case, the resin solution is dried by filtration through a bed of a suitable drying agent, such as lime.

If desired, the diluent may be added before polymerization instead of after polymerization.

After neutralization and drying, the resin may be isolated from the unpolymerized oil by any desired method, or the resin may be concentrated therein by vacuum distillation, which may be assisted by steam. The melting point of the resin and the yield obtained will depend, among other things, upon the extent to which the resin has been removed from the unpolymerized oil.

Furthermore, the addition of other materials to the heat polymerizable monomeric unsaturated materials prior to polymerization or to the resins after polymerization may, of course, modify the properties of the resins produced. Examples of such materials are other synthetic or natural resins, plasticizers, softeners, fillers, coloring materials, etc.

The resin employed may comprise mixed polymers of monomeric material boiling within the range of from 210° C. to 450° C. together, if desired, with polymers of monomers boiling outside of this range, or resins may be employed which are produced from monomers boiling within a selected range or ranges within the range of from 210° C. to 450° C., for instance from separated material boiling above say 250° C. or say above 280° C.

The extracted oils may, for example, be distilled prior to polymerization to give a high boiling fraction and a low boiling fraction, which may be polymerized separately. In general, it has been found that the resins obtained from the low boiling fraction, that is, the oils boiling below, say, 300-325° C., or even lower, usually are substantially lighter in color than the corresponding resins obtained from the high-boiling fraction. The use of such light colored resins may be preferred for certain of the applications disclosed herein.

In separating such material, the dead oil containing the monomers may be fractionated by distillation under vacuum, assisted by steam to avoid undue polymerization during the separation, or other methods of separation may be employed.

As previously pointed out, the herein described resins, namely, those obtained by the thermal and/or catalytic polymerization of the unsaturated monomeric material recovered from the tar formed during the production of gas by processes involving the pyrolytic decomposition or conversion of hydrocarbon oil, with or without the aid of catalysts, may be decolorized by a process comprising depolymerization, followed by repolymerization of the monomeric material obtained. The repolymerization may be carried out by any of the methods described, or otherwise.

The initial depolymerization step may be carried out by batch depolymerizing methods, although I greatly prefer to employ methods in which a thin film or stream of the resin is depolymerized.

A solution of the resin also may be employed in the depolymerizing operation, in which case a solvent in which the resin is readily soluble and which is substantially inert to the resin and its monomers is preferred. Examples of suitable solvents are hydrocarbon solvents, and particularly aromatic hydrocarbon solvents, such as benzene, toluene, xylene, or solvent naphtha.

Thus, a mixture of solvent and resin may be melted by the application of heat. By the use of this method, relatively small quantities of solvent and moderate temperatures may be employed in the production of a liquid mixture to be introduced into the depolymerizing unit.

However, I generally prefer to use polymer solutions which are liquid at room temperature, as such solutions may be handled with less difficulty than solutions containing less polymerizable solvent.

The depolymerization of the resin or resin solution may be carried out in the presence or absence of certain other diluents in the reaction zone, such as steam, saturated or non-polymerizable solvents, particularly relatively low boiling non-polymerizable solvents such as propane, butane, pentane, petroleum ether, benzene, and toluene, and inert gases, such as nitrogen, carbon dioxide, stack gases, and the like. These diluents may be heated or superheated prior to their introduction into the reaction zone, in which case they may be used as the sole source of heat in the reaction zone, or they may be used in conjunction with the external application of heat thereto, or otherwise.

The use of steam is particularly desirable. Preferably steam (or other diluent) is supplied in ratio of at least 1 part of steam (or other diluent) to 10 parts of resin by weight, such as, at least 1 part of steam (or other diluent) to 2 parts of resin by weight, and more particularly, at least 1 part of steam (or other diluent) to 1 part of resin by weight. Usually the ratio of steam (or other diluent) to resin rarely exceeds 5 parts steam (or other diluent) to 1 part resin by weight, or more particularly 3 to 1, or 2 to 1. However, higher or lower ratios may be employed.

The depolymerizing operations may be carried out at atmospheric, sub-atmospheric, or super-atmospheric pressures. In general, atmospheric or sub-atmospheric pressures are preferred.

In addition to being introduced into the reaction vessel in solution form, the resin may be introduced in molten condition in the absence or substantially complete absence of solvent, or introduced in the form of finely divided particles or powder.

As the resin is thermally stable at temperatures below 200° C., temperatures above this point normally should be employed in order to obtain satisfactory yields of monomer within a reasonable period of time. I have found that the use of temperatures above 300° C. and, particularly, above 400° C., and still more particularly above 450° C., are very satisfactory for the production of monomer according to the methods described herein. Temperatures up to 550° or 600° C., or above, give excellent yields. When temperatures above 800° C. are employed, especial care should be exercised to keep contact time sufficiently short to avoid undue side reactions and/or decomposition of the resin beyond the monomeric state.

Usually the monomeric material is withdrawn from the reaction zone substantially as rapidly as formed.

The desired resin or resin solution may be charged to the reaction zone by any desired method. Thus, for example, the resin or resin solution may be pumped into the reaction zone, or it may be forced into the reaction zone by the application of pressure, or it may be drawn into the reaction zone by reducing the pressure therein, or otherwise. The container, pipe, tubes, valves, pumps, and other devices and equipment used to store the resin or resin solution prior to its delivery to the reaction zone, and to deliver it to the reaction zone at the desired rate, may be heated by any desired method to insure that the polymer is maintained at the desired temperature, if desired. This may be accomplished, among other ways, by providing such items of equipment with suitable jackets or coils through which steam or any other desired heating medium may be passed, or by the use of electrical resistance heaters for this purpose, or otherwise.

The resin or resin solution may be heated to any desired temperature prior to its introduction into the reaction zone, if desired. Thus, for example, it may be heated to an incipient decomposition temperature, or almost to this point, before being introduced into the reaction zone. In case a relatively low boiling solvent is present, the resin-solvent mixture may be heated under a pressure sufficient to maintain the solvent in the liquid state at the chosen temperature prior to its introduction into the reaction zone.

An alternative method of introducing the resin or resin solution to the reaction zone comprises carbureting it with steam, a solvent or other liquid in the vapor state, an inert gas, or other suitable agent. This method is especially applicable to relatively low-melting polymers, or solutions thereof, possessing an appreciable vapor pressure at temperatures below their initial depolymerizing temperature. Thus, for example, a solution of the resin in a solvent may be heated to a temperature of, say, 200° C. in a suitable vessel. A suitable carbureting medium such as, for example, superheated steam is passed through the heated liquid resin solution, the mixture of steam and carburetted polymer solution then being delivered to the reaction zone. By a suitable control of the type of resin or resin solution employed, the temperature to which it has been heated, and the temperature of the steam employed for carbureting purposes, almost any desired ratio of steam and resin may be delivered to the reaction zone.

Fairly high boiling solvents preferably should be employed for this purpose and/or the solvent present in the carburetor replenished from time to time. A relatively low melting type of resin also is preferably employed. Otherwise, the solvent may be removed completely from the carburetor before all of the resin has been charged to the unit.

In the foregoing methods, the resin or resin solution may be delivered to the reaction zone in the form of a thin layer or stream, or in the form of a spray or mist of finely divided particles, depending, upon other things, upon the type of fitting employed at the termination of the delivery pipe or other device in the reaction zone.

As pointed out previously, I have discovered that resin or resin solutions of the type described may be readily depolymerized to give good yields of monomeric material by the application of heat, preferably to only a limited quantity of such resin or resin solution at any given time.

Thus, for example, the resin or resin solution may be introduced into a heated vessel provided with a stirring device conforming to the interior thereof and sufficiently close to the sides of the vessel to prevent any undue accumulation of material thereon. In general, vessels of this type provided with a stirrer or scraping device extending over the major portion of the interior surface of such vessels, particularly the lower portion thereof in the case of vertical vessels, are well adapted to the production of monomeric material by thermal depolymerization. In general, the clearance between the heated walls of such vessels and the agitator or scraper should preferably be less than ¼″ and, more preferably, less than ⅛″. Excellent results are obtained when the clearance between the two surfaces is 1/16″ or less, and optimum results may be obtained when the agitator or scraper actually scrapes the interior surface of the reaction vessel. Thus, for example, vessels of the type commonly employed in the petroleum industry for blending or compounding greases, and in which the agitator scrapes the rounded bottom and the lower portions of the sides of the reaction vessel, are well adapted to the preparation of monomeric material by thermal depolymerization methods.

In operation, the vessel is heated to the desired temperature, after which the resin, or a mixture of the resin and one or more other agents, such as a solvent, preferably one having a low boiling point, steam, and/or an inert gas, is introduced into the reaction vessel at any desired rate. The resin or resin solution is distributed on the bottom and sides of the reactor by means of the agitator blade, the rate of flow of the resin and the depolymerizing temperature usually being so regulated that only a thin film of resin is present on the bottom and sides of the reaction vessel at any given period of time.

It will be understood, of course, that the foregoing units only serve to illustrate one method of realizing the advantages of the invention and are not to be construed as limiting it in any way. In general, any method of depositing a relatively thin layer of the desired resin or resin solution upon a suitably heated surface will serve to depolymerize the polymer in a satisfactory manner.

Another suitable method for the depolymerization of resins or resin solutions of the type described comprises contacting with a molten metal, alloy, salt, mixture of salts, or other liquids capable of withstanding relatively high temperatures without appreciable decomposition.

An excellent method for the depolymerization of resinous polymers of the type described comprises the application of heat thereto while in a very finely divided form. Any desired method of subdividing the polymer solution may be employed, such as pumping or forcing the polymer solution through a suitable nozzle, orifice, constriction, or fitting designed to subdivide the stream into a relatively large number of small, discrete particles. Other methods of accomplishing this purpose may, of course, be used if desired. Thus, for example, the resin or resin solution may be pumped, flowed, or otherwise delivered to the top of a suitable tower or vessel and permitted to flow over a perforated plate or screen, or both, or otherwise, in such manner as to disperse the material in the form of very thin streams, or drops, or otherwise.

Other methods and devices suitable for contacting the finely divided resin or resin solution may, of course, be employed. Thus, for example, the reaction vessel or tower shown may be conical in shape in order to prevent or retard any undue accumulation of polymer on the sides of the vessel. Other refinements will, of course, be apparent to those skilled in the art.

Another suitable method of depolymerizing resins or resin solutions is to pump, blow or otherwise force such materials through a tubular unit possessing a fairly narrow cross-sectional area, preferably while the resin is in a finely divided or vaporized form, or otherwise. A pipe coil, tube bundle, or conventional cracking furnace may be used for this purpose with excellent results.

Other methods familiar to those engaged in the pyrolysis of petroleum may be used if desired. Other types of furnaces also may be employed, such as the de Florez furnace, a tube coil immersed in a molten metal bath, and the like.

In addition, the resin or resin solution or admixture may be charged to a conventional gas set, or a modification thereof, such as those employed for the production of blue gas, oil gas, carburetted water gas, and the like.

Other methods based upon heating a stream of finely divided resin or resin solution, either alone or in conjunction with one or more assisting agents such as steam, another solvent, a gas, or a mixture thereof, may be used, if desired.

It is to be understood, also, that any combination of the foregoing depolymerizing methods may be used for the production of the said monomeric material.

In addition, any of the refinements or special methods discussed in connection with any of the foregoing units may be used in conjunction with, or in combination with, or otherwise with, any of the other units described.

The method of condensing and cooling the depolymerized, and other, materials obtained also is important from the standpoint of obtaining good yields. The vapors preferably should be condensed and cooled as rapidly as possible in order to prevent any recombination and to prevent side reactions from occurring to any substantial degree. This may be accomplished by conducting the vapors into an efficient condenser and cooling as quickly as possible, a satisfactory condenser for this purpose being a water cooled shell and tube condenser. The depolymerized materials also may be shock-cooled if desired, such as by injecting a spray or stream of water or other cooling medium directly into the depolymerized products obtained from the reaction zone, or by passing the depolymerized products through a wash box filled with water, or otherwise.

In general, it may be said that the best results are obtained when the resin or resin solution is depolymerized in the form of thin films or small discrete particles or streams in the shortest possible period of time, then condensing and cooling the depolymerized products in the shortest possible period of time. Any undue increase in the depolymerizing time, or the time required to condense and cool the depolymerized materials, may be reflected in decreased yields and in the presence of substantial quantities of higher boiling oils and other undesirable by-products in the product obtained.

The steam, non-polymerizable solvents, gases, or mixtures thereof, which may be charged to the depolymerizing unit with the resin assist in the reaction in many ways. They may serve to transmit heat directly to the resin, to assist in sweeping out the products of the depolymerization from the reaction zone in the shortest possible period of time, and to serve as diluting agents, thus preventing, or reducing the rate of, the combination of the polymerizable materials present.

As pointed out previously, also, the steam, solvent vapors, gases, or mixtures thereof used as assisting agents in the depolymerization may be preheated to any desired extent before being added to the polymer solution or introduced into the reaction zone, or otherwise, and such agent or agents, may be used as the sole source of heat, if desired.

By the use of the foregoing preferred methods for the depolymerization of resins of the type described, all of which are based upon the principle of exposing a limited quantity of the said resin to elevated temperatures for a limited period of time under conditions designed to effect a rapid transfer of heat from the heating surface or medium to the resin, removing the depolymerized materials from the heating zone, and condensing and cooling them as rapidly as possible, excellent yields may be obtained.

The depolymerization is preferably carried out in a relatively short period of time. The application of elevated temperatures to the resin for prolonged periods of time, such as may be encountered, for example, in batch depolymerizing methods, may result in the conversion of a relatively large proportion of such polymers into high boiling oils and similar undesirable impurities. In general, it may be said that the time of depolymerization is a function of the depolymerizing temperature employed. By the use of the proper type and size of unit, the contact time in the depolymerizing zone preferably rarely exceeds 10 minutes and, in most cases will not exceed 5 minutes. Contact times substantially under 5 minutes and, more particularly, under 1 minute, will be found to give excellent results.

The process may be more particularly described by means of the following example.

*Example 3*

A heat resin of polymer produced as described in Example 1 is charged to a depolymerizing unit comprising a vessel provided with an agitator and containing sufficient lead to form when molten a surface approximately ½" below the level of the agitator. The vessel is heated to a temperature of 650° C. and the resin is charged at a rate sufficient to maintain a depth of 1" on the surface of the lead in the vessel during the course of the depolymerization. The depolymerized products are drawn off from the vessel and are condensed and cooled substantially as rapidly as formed. The resulting monomeric material obtained is repolymerized by the application of heat at 200° C. (±10° C.) in the same manner as the original polymerization was effected in Example 1. A resulting heat polymer resin very much lighter in color than the original resin is obtained.

To summarize, the hydrocarbon polymers or resins to which this invention relates may be characterized as follows:

(1) The polymers or resins are comprised of carbon and hydrogen in chemical combination to at least 98% and more particularly, to at least 99%, other elements such as oxygen, nitrogen and/or sulfur derived from the oil pyrolyzed, if present, being restricted to less than 2%, and more particularly to less than 1%.

(2) The polymers or resins are substantially completely soluble in an excess of benzene, the proportion of insoluble material being less than 1%, and more particularly, less than 0.1% of the polymer or resin.

(3) The polymers or resins have an ash content determined by burning of less than 1%, and more particularly, of less than 0.1%.

(4) Upon subjecting the polymers or resins to destructive distillation under vacuum to effect depolymerization, that portion of the oily material recovered as overhead which boils above 200° C. has a refractivity intercept of at least 1.08 and particularly of at least 1.09 and still more particularly, of at least 1.10.

(5) Polymers or resins hardened by distilling to an overhead temperature between approximately 190 to 200° C. at 20 mm. Hg absolute pressure in accordance with the procedure of Example 1 have the following characteristics:

(a) They have A. S. T. M. ball and ring softening points of at least 40°C. and more particularly of at least 80° C. For example, typical polymers or resins polymerized by surface active agents such as clay, as catalysts, have A. S. T. M. ball and ring softening points of at least 40° C., such as between 60° C. and 80° C. or above, and typical polymers or resins polymerized by heat, or with acid or acid-acting catalysts, have A. S. T. M. ball and ring softening points of at least 80° C., such as between 90° and 110° C. and higher, such as up to 120° C. or above.

(b) They have densities of at least 1.10 and up to 1.20 and higher, such as between 1.13 and 1.18, as determined by the water displacement method.

(c) They have molecular weights between 300 and 1000 as determined by the freezing point depression method employing benzene as the solvent.

(d) They have a solubility in an equal quantity by weight of toluene at a temperature of 20° C. of at least 30 grams, and preferably of at least 50 grams, in 100 grams of toluene.

(e) One part of the polymers or resins when dissolved in three parts by weight of benzene having a density (d 20/4) of 0.8790 and a refractivity intercept of 1.0623, makes four parts of a solution having a density greater than 0.925 and a refractivity intercept greater than 1.069. Neglecting any possible change that may occur in the solid when it is dissolved, calculated values for the polymers or resins themselves, that is, apart from the solvent, (densities and refractivity intercepts being additive on a volume basis) become for densities at least 1.10, and for refractivity intercepts at least 1.08, and particularly, at least 1.09, and still more particularly, at least 1.10.

(6) The oils from which the polymers or resins are polymerized have mixed aniline points below 15° C., and more particularly, below 10° C., for example, between 10 and 4° C. and lower. A mixed aniline point of a given oil is defined as the critical solution temperature of a mixture of 10 cc. of anhydrous aniline, 5 cc. of the oil being tested and 5 cc. of a petroleum naphtha having an aniline point of 60° C., as determined by A. S. T. M. tentative standard D 611–41T.

(7) The oils from which the polymers or resins are polymerized usually having refractivity intercepts of not less than 1.08, for example, between 1.09 and 1.11, and higher, such as, up to 1.125 or 1.135.

(8) The oils from which the polymers or resins are polymerized contain at least 90%, such as not less than 95%, and more particularly not less than 97% of aromatic hydrocarbons.

(9) The oils from which the polymers or resins are polymerized have densities of not less than 0.95, and, more particularly, of not less than 0.98, for example, between 0.99 and 1.02, and higher, such as up to 1.11 or 1.12.

(10) Liquid material extracted from the polymers or resins using a large excess of pentane has refractivity intercepts of at least 1.08 and more particularly, of at least 1.09, and still more particularly, of at least 1.10.

(11) The oil separated from the polymers or resins after polymerization usually has a density of not less than 0.95 and, more particularly, of not less than 0.98, for example, between 0.99 and 1.02 and higher, such as up to 1.11 or 1.12. Such oils separated from the polymers or resins after polymerization also usually have refractivity intercepts of not less than 1.08, for example, between 1.09 and 1.11, and higher, such as up to 1.125 or 1.135, and contain at least 90%, such as at least 95%, and more particularly, at least 97% aromatic hydrocarbons.

(12) Refractivity intercept when referred to herein is determined by the method described in the Science of Petroleum (1938) vol. 2 beginning on page 1175, and publications referred to therein.

While specific procedures have been particularly described, as well as the units in which such depolymerization may be conducted, it is to be understood that these are by way of illustration. Therefore, changes, omissions, additions, substitutions, and/or modifications may be made within the scope of the claims without departing from the spirit of the invention.

I claim:

1. A process for producing unsaturated resin-forming hydrocarbon material comprising heating in a heating zone in attenuated form in the presence of steam and under temperature conditions between 400° C. and and 800° C. and for a period of time sufficient to effect depolymerization to unsaturated resin-forming material a solution in an aromatic hydrocarbon solvent substantially inert under the conditions obtaining of mixed hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 450° C. which are not polymerizable by the application to said oil of heat alone but which are polymerizable to catalytic resin polymer by treating said oil with a resin-producing catalyst, other hydrocarbons boiling between 210° C. and 450° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 450° C., while removing the resulting depolymerized material from said heating zone and cooling said removed material substantially as rapidly as formed, said steam being present in said heating zone in a proportion between 1 part steam to 10 parts resin polymer by weight and 5 parts steam to 1 part resin polymer by weight; and thereafter repolymerizing said removed depolymerized products in liquid phase.

2. A process for the production of hydrocarbon heat resin polymer comprising heating in attenuated form and in solution in an aromatic hydrocarbon solvent substantially inert under the conditions obtaining and under temperature conditions between 400° C. and 800° C. and for a period of time sufficient to effect depolymerization mixed hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 450° C. which are not polymerizable by the application to said oil of heat alone but which are polymerizable to catalytic resin polymer by treating said oil with a resin-producing catalyst, other hydrocarbons boiling between 210° C. and 450° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 450° C., while removing the resulting depolymerized material from said heating zone and cooling said removed material substantially as rapidly as formed, said depolymerization being effected in the presence of steam in proportion between 1 part of steam to 10 parts resin by weight and 5 parts steam to 1 part resin by weight, and repolymerizing said removed depolymerized material in liquid phase by the application of heat.

3. A process for the production of hydrocarbon catalytic resin polymer comprising heating in attenuated form and in solution in an aromatic hydrocarbon solvent substantially inert under the conditions obtaining and under temperature conditions between 400° C. and 800° C. and for a period of time sufficient to effect depolymerization mixed hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 450° C. which are not polymerizable by the application to said oil of heat alone but which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 450° C., while removing the resulting depolymerized material from said heating zone and cooling said removed material substantially as rapidly as formed, said depolymerization being effected in the presence of steam in proportion between 1 part of steam to 10 parts resin by weight and 5 parts steam to 1 part resin by weight, and repolymerizing said removed depolymerized material in liquid phase by contact with a resin-producing catalyst.

4. A process for the production of hydrocarbon catalytic resin polymer comprising heating in attenuated form and in solution in an aromatic hydrocarbon solvent substantially inert under the conditions obtaining and under temperature conditions between 400° C. and 800° C. and for a period of time sufficient to effect depolymerization mixed hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 450° C. which are not polymerizable by the application to said oil of heat alone but which are polymerizable to catalytic resin polymer by treating said oil with a resin-producing catalyst, other hydrocarbons boiling between 210° C. and 450° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 450° C., which removing the resulting depolymerized material from said heating zone and cooling said removed material substantially as rapidly as formed, said depolymerization being effected in the presence of steam in proportion between 1 part of steam to 10 parts resin by weight and 5 parts steam to 1 part resin by weight, and repolymerizing said removed depolymerized material in liquid phase by contact with sulfuric acid.

5. The hydrocarbon heat resin polymer produced by the process of claim 2.

6. The hydrocarbon sulfuric acid resin polymer produced by the process of claim 4.

7. The hydrocarbon resin polymer produced by the process of claim 1.

FRANK J. SODAY.

REFERENCES CITED

The following references are of record in the file of this patent:

UNITED STATES PATENTS

| Number | Name | Date |
| --- | --- | --- |
| 1,640,975 | Brown | Aug. 30, 1927 |
| 1,703,950 | Ostromislensky | Mar. 5, 1929 |
| 2,084,012 | Thomas | June 15, 1937 |
| 2,150,641 | Thomas | Mar. 14, 1939 |
| 2,248,512 | Philip | July 8, 1941 |
| 2,359,212 | Frank | Sept. 26, 1944 |
| 2,387,237 | Ault | Oct. 23, 1945 |
| 2,387,259 | Hall | Oct. 23, 1945 |